United States Patent [19]

Santos

[11] Patent Number: 4,825,559

[45] Date of Patent: May 2, 1989

[54] PREGAUGING TOOL FOR A CUTTING TABLE

[76] Inventor: Larry E. Santos, P.O. Box 1000, Lewisburg, Pa. 17837

[21] Appl. No.: 126,992

[22] Filed: Nov. 30, 1987

[51] Int. Cl.⁴ .............................................. B43L 7/00
[52] U.S. Cl. ....................................... 33/630; 33/430; 33/479; 33/464
[58] Field of Search ................. 33/630, 633, 479, 480, 33/464, 427, 486, 173, 430

[56] References Cited

U.S. PATENT DOCUMENTS

| | | | |
|---|---|---|---|
| 1,713,025 | 5/1929 | Castleman | 33/437 |
| 2,059,740 | 11/1936 | Minchew | 33/628 X |
| 4,204,335 | 5/1980 | Grossman | 33/476 |
| 4,644,663 | 2/1987 | Needs | 33/486 |

FOREIGN PATENT DOCUMENTS

| | | | |
|---|---|---|---|
| 157371 | 12/1932 | Switzerland | 33/427 |
| 18817 | of 1907 | United Kingdom | 33/437 |

Primary Examiner—Harry N. Haroian
Attorney, Agent, or Firm—Thomas Schneck

[57] ABSTRACT

A pregauging tool for the stop assembly of a cutting device wherein the pregauging tool has a scale having an elongated configuration and opposed substantially parallel longitudinal edges. At least one series of graduations extends longitudinally along the scale and a flange member is mounted at the end of the scale associated with the zero index of the graduations. The flange member has a linear first side adapted for securement along a cutting plane of the cutting device. An indicator member is slideably fit to the scale and has a cantilevered abutment arm extending in a transverse direction relative to the longitudinal dimension of the scale. The abutment arm has a lead end defining a registration plane for reading of the scale graduations, and has a trail end spaced apart from the lead end by a distance equivalent to the portion of the graduations covered by the flange member.

3 Claims, 1 Drawing Sheet

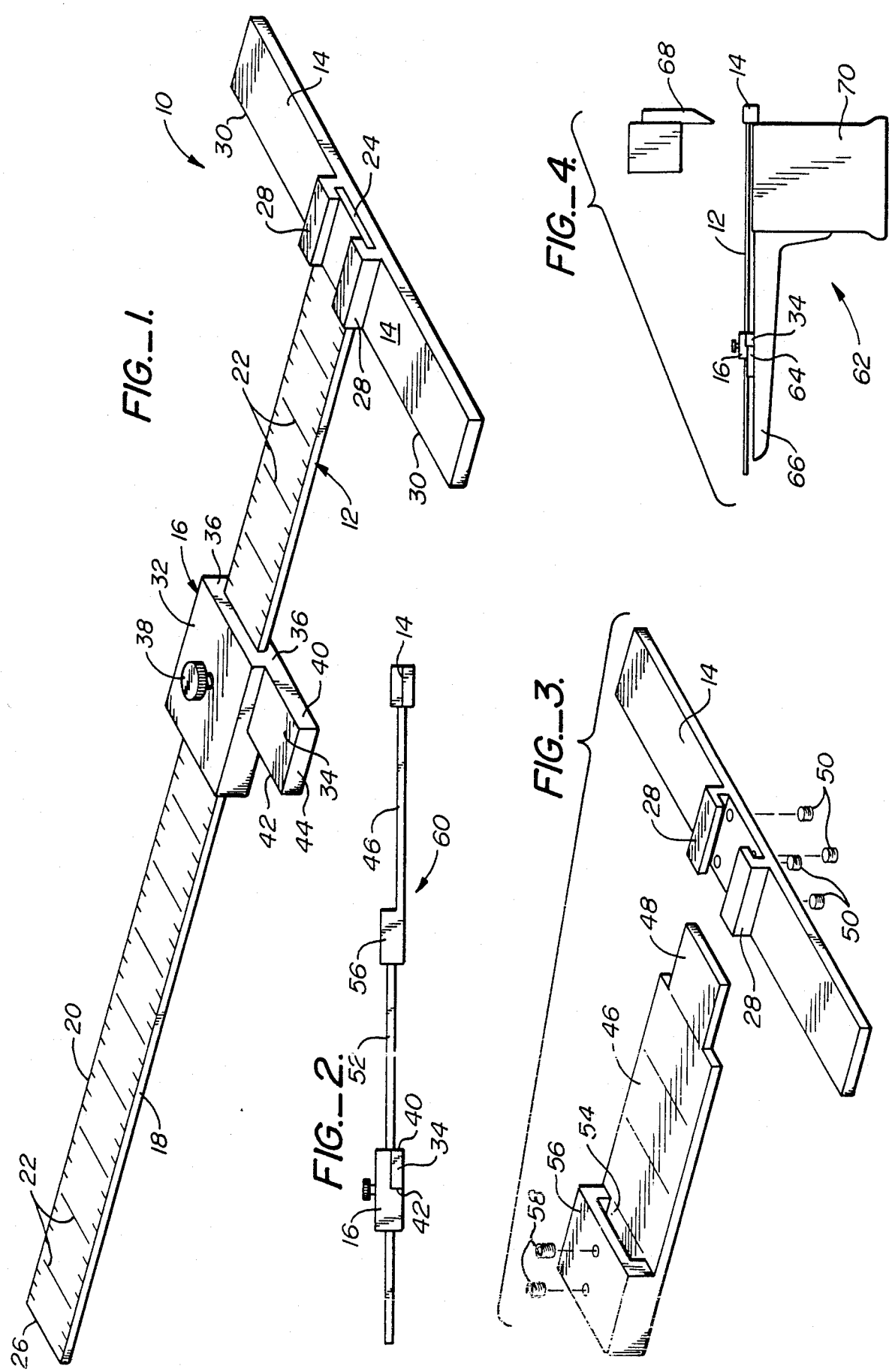

4,825,559

PREGAUGING TOOL FOR A CUTTING TABLE

DESCRIPTION

1. Technical Field

The present invention relates to set-up tools for a cutting device.

2. Background Art

Cutting devices having feed tables which can be adjusted for insuring a dimensionally exact cut are varied. For example, a sheet metal shear having a feed table may include one or more front gauges which are displaced relative to the cutting plane of the sheet metal shear. The front gauges position step blocks which act as end stops for a workpiece of sheet metal. In addition to the step blocks, a sheet metal shear typically includes a calibrated flipper which functions as a lateral stop.

Exact adjustment of the end stops of a cutting device may involve a number of problems. A sheet metal shear, for example, has at least one rail which is dove-tailed with the adjustment assembly. Prior to cutting, the adjustment assembly is moved within the dovetail to a desired position and then tightened. The step blocks, however, have a tendency to twist during tightening, so that the step block is out of square with the cutting plane of the shear. A step block which has been twisted will produce cuts which vary in corner-to-corner measurement. Moreover, the adjustment process is an inexact procedure, and therefore accurate duplication of a cut after movement of the adjustment assembly is difficult.

It is an object of the present invention to provide a set-up tool which increases the accuracy, dependability and swiftness of gauging sheet metal shears and the like.

SUMMARY OF THE INVENTION

The above object has been met by a pregauging tool that locks a gauge assembly in the desired position prior to tightening of the gauge assembly. Locking the gauge assembly in position insures that the cutting device renders precise cuts after each resetting. The pregauging tool includes an elongated scale having at least one series of graduations extending longitudinally along the scale. Preferably, the scale is a conventional metallic measuring stick with graduations either in sixty-fourths of an inch or in millimeters. A flange member is mounted at an end of the scale associated with the zero index of the graduations. One side of the flange member has a linear configuration extending perpendicular to the longitudinal extension of the scale. During adjustment of a cutting tool this linear side of the flange member is secured along the cutting plane of the cutting device. For example, on a sheet metal shear the pregauging tool is positioned with the linear side of the flange member abutting a shear blade and the scale extending in the direction of the gauge assembly.

An indicator member is slideably fixed to the scale. The indicator member includes a body which straddles the scale and includes an abutment arm which is cantilevered from the body in a direction transverse to the longitudinal extension of the scale. An internally threaded bore penetrates the indicator member and receives a bolt which, when tightened, secures the indicator member in position on the scale. In use, the indicator member is locked in a desired position and then laid flat upon the feed table of the cutting device, whereafter the gauge assembly of the cutting device is brought into abutting relation with the abutment arm.

When a conventional measuring stick is utilized as the scale, the flange member will cover a portion of the scale at the zero index of the graduations. Therefore, the abutment arm of the indicator member has a lead edge which is spaced apart from a trail edge by a distance equal to the portion of scale covered by the flange member. The plane defined by the lead edge of the abutment arm is employed to register the desired measurement of work piece cut. The trail edge may then be used for abutment against the gauge assembly, thereby compensating for that portion of the scale covered by the flange member. Optionally, the scale and the flange member may be fixed at opposed ends of an extension member so that the flange member does not cover any portion of the scale.

An advantage of the present invention is that the gauge assembly is caused to abut a stationary member during tightening of the gauge assembly. The gauge assembly is held firmly in place and does not move during Allen-wrench tightening of the gauges. Thus, accurate cutting of a work piece to a desired length is insured. Another advantage is that corner-to-corner measurement of the cut work piece is consistent, since abutment of the gauge assembly against the indicator member prevents twisting of the step blocks from the torque exerted by tightening of the gauges.

BRIEF DESCRIPTION OF THE DRAWINGS

FIG. 1 is a perspective view of a pregauging tool in accord with the present invention.

FIG. 2 is a side view of a second embodiment of the pregauging tool of FIG. 1.

FIG. 3 is a partial exploded view of the tool of FIG. 2.

FIG. 4 is an operational view of the tool of FIG. 1.

BEST MODE FOR CARRYING OUT THE INVENTION

With reference to FIG. 1, a pregauging tool 10 includes a precision scale 12, a flange member 14 and an indicator member 16. The precision scale 12 has an elongated configuration with parallel longitudinal edges 18 and 20. A series of unit markings 22 provide graduations from a zero index at a blade end 24 of the precision scale 12. The unit markings 22 extend along the longitudinal edges 18 and 20 to a maximum at the rearward end 26 of the precision scale 12. The optimum length of the precision scale 12 is dependent upon the desired application, ranging from 12 inches to 120 inches. Likewise, the spacing between unit markings 22 is not critical. One side of the precision scale 12 may be graduated in sixty-fourths of an inch measurements, while the opposite side is graduated in measurements of one hundred twenty-eights of an inch. Optionally, the precision scale 12 may be a metric scale.

The flange member 14 is secured to the blade end 24 of the precision scale 12. The flange member includes inverted L-shaped legs 28 which are oppositely faced to receive the precision scale 12. In assembly, the L-shaped legs are positioned to straddle the precision scale 12, whereafter four Allen screws are tightened to securely mount the flange member 14 to the precision scale.

The flange member 14 has a linear flange edge 30 which perpendicularly faces the longitudinal extension of the precision scale 12. It is critical that the flange member 14 be configured so that the flange edge 30 may abut the cutting plane of a cutting device during gauging of the cutting device. For example, on a shear table the flange edge 30 should abut a shear blade to permit use of the unit markings 22 to measure distances from the shear blade. The flange edge 30 extends downwardly from the precision scale 12, allowing the precision scale to lie flat against a feed table of the cutting device.

The precision scale 12 is preferably a conventional steel rule having a width of 1.5 inches. The elongated flange member 14 is typically 10 inches in length and has a width of 1 inch. The inside surfaces of the inverted L-shaped legs are spaced apart by a distance of 1.5 inches to form a slot to receive the precision scale 12 at the midsection of the flange member 14.

The indicator member 16 has a slider body 32 and an abutment arm 34. The slider body 32 has opposed L-shaped straddle legs 36 which form a slot to slideably receive the precision scale 12. Thus the slider body 32 may be selectively repositioned along the length of the precision scale 12 to register measurement along the unit markings 22. Upon registration of a desired measurement, the slider body 32 is locked in position by tightening of a finger fastener 38. The finger fastener 38 is a knurled lock bolt and is received in an internally threaded bore that penetrates the slider body 32.

The abutment arm 34 has a lead edge 40, a trail edge 42 and a lateral edge 44. The lead edge 40 is flush with the forward surface of the straddle legs 36. The lead edge 40, therefore, provides a structural extension of the registration plane of the slider body 32. As described above, the width of the flange member 14 is 1 inch. Consequently, the flange member will cover the first inch of the precision scale 12. To compensate for this loss of an inch, the lead edge 40 of the abutment arm 34 is spaced apart from the trail edge 42 by a distance of 1 inch. That is, the lateral edge 44 has a length of 1 inch. Gauges of a cutting device may therefore be brought into contact with the trail edge 42 and then secured in position so that the cutting plane of the device is the distance from the trail edge 42 registered by the lead edge 40. Preferably, the abutment arm 34 is cantilevered from the slider body 32 by a distance of 2 inches, thereby providing sufficient abutment surface for exact positioning of cutting device gauges.

Referring now to FIGS. 2 and 3, rather than being secured directly to a precision scale, the flange member 14 may be mounted to an extension bar 46. The extension bar 46 is narrowed at a forward end 48 for insertion between the inverted L-shaped legs 28 of the flange member 14. The extension bar 46 is then secured to the flange member 14 by Allen screws 50. A truncated precision scale 52 is then received within a slot 54 defined by a bridge structure 56 of the extension bar 46. The truncated precision scale 52 is securely fixed within the slot 54 by pressure from screws 58. Functionally the tool 60 illustrated in FIGS. 2 and 3 is identical to the pregauging tool 10 of FIG. 1. An indicator member 16 is positioned on the precision scale 52 to register a desired length of cut along a registration plane defined by the lead edge 40 of the abutment arm 34. Pressure is then exerted against the gauge of a cutting device to bring the gauge into contact with the trail end 42 of the abutment arm 34.

The optimum length of the extension bar 46 depends upon the desired application. Typically, the extension bar is 10 inches in length and has a height of approximately 0.093 inches. As seen in FIG. 2, the bottom of the extension bar 46 is flush with the indicator member 16.

In assembling the pregauging tool 10 of FIG. 1 the flange member 14 is first fixed to the end of a precision scale 12 associated with the zero index of the unit markings 22. The indicator member 16 is then slideably fit to the precision scale 12. Referring now to FIG. 4, during setup of a shear device 62 a stop assembly 64 is received within the dovetail of a front rail 66. Positioning of the stop assembly 64 determines the length of a sheet metal work piece cut in the shear device 62. Typically the stop assembly 64 is locked in position by a pair of gauge screws, not shown. However, the stop assembly has a tendency to twist during tightening of the gauge screws. Moreover, often the stop assembly 64 will begin to lift during tightening of the gauge screws, particularly if the rear screw is tightened prior to the front screw. The present invention, however, provides precise positioning of the stop assembly 64.

In use, the indicator member 16 is positioned along the precision scale 12 so that the registration plane defined by lead edge 40 of the abutment arm 34 registers the desired length of workpiece cut at the unit markings 22. As shown in FIG. 4, the flange member 14 is then moved under the upper blade 68 of the shear device 62 and is disposed so that the flange edge 30 contacts the lower shear blade 70. The stop assembly 64 of the shear device 62 is then moved into abutting relation with the trail edge 42 of the abutment arm 34. An operator may use one hand to apply a rearward pressure against the lead edge 40 and to apply a forward pressure against the stop assembly 64. With the other hand, the gauge screws are tightened. Contact of the stop assembly 64 with the indicator member 16 prevents undesired movement of the stop assembly 64 during tightening of the gauge screws.

While the present invention has been illustrated for use on a sheet metal shear, it is understood that the pregauging tool may be used with other cutting devices. Additionally, while optimally the indicator member 16 includes an abutment arm 34 as illustrated, a stop assembly of a cutting device may be pressed against the back surface of an indicator member 16, rather than against an abutment arm 34.

I claim:

1. A pregauging tool for adjustment of a cutting table gauge to govern the dimensional cut of a workpiece, comprising, a flange member having a straightedge adapted for abutment along a cutting plane of a cutting table, an elongated calibrated scale positioned in fixed relation to said flange member, said elongated scale extending perpendicular to the straightedge of said flange member and having calibration indicia numerically increasing in relation to the distance from said flange member, wherein said elongated scale is a conventional measuring stick and said flange member is fixed to said measuring stick at an end having a zero index to cover a portion of said measuring stick, and an indicator member adjustably mounted to said elongated scale, said indicator member having releasable attachment means for permitting adjustment of the position of the indicator member along said elongated scale relative to said straightedge of the flange member, whereby said indicator member is positioned on said elongated scale at a calibration indicium corresponding to a desired length for work piece cutting, said indicator member having an abutment arm having a lengthwise dimension perpendicular to said elongated scale and having a widthwise dimension corresponding to the portion of said measuring stick covered by said flange member.

2. A tool for gauging a cutting device comprising, a scale having an elongated configuration and opposed substantially parallel longitudinal edges, at least one series of graduations extending longitudinally along said scale, a flange member mounted at an end of said scale associated with a zero index of said graduations, said flange member including one side having a linear configuration extending perpendicular to the longitudinal edges of said scale, said side of the flange member adapted for securement along a cutting plane of a cutting device, wherein said flange member covers a portion of said series of graduations, and an indicator member slidably fixed to said scale, said indicator member having an abutment arm cantilevered from said indicator member in a transverse direction relative to said scale, wherein said abutment arm of said indicator member has a lead edge to register a desired location on said scale and has a trail edge for abutment against a gauge of said cutting device, said trail and lead ends of said abutment arm spaced apart by a distance substantially equal to the portion of said series of graduations covered by said flange member.

3. A process for pregauging a cutting device of the type having a feed table and a gauging assembly, comprising, abutting a straightedge of a flange member against a cutting edge of a cutting device, said flange member being an element of a pregauging tool having an elongated scale fixed to said flange member is perpendicular relation thereto and having an indicator slide in slidable relation along said scale.

adjusting the position of said indicator slide relative to said flange member, said scale having calibration markings numerically increasing in accord with the distance from said flange member, said adjusting of the position being a moving of the indicator slide to a calibration marking corresponding to a desired length of cutting of a workpiece by said cutting device, displacing a gauging assembly of said cutting device to a precise location in abutting relation to said indicator slide, fastening said gauging assembly in said precise location, and removing said pregauging tool from said cutting device such that said straightedge of the flange member is withdrawn from said abutment against the cutting edge of the cutting device.

* * * * *